United States Patent [19]
Nakazawa

[11] Patent Number: 5,938,296
[45] Date of Patent: Aug. 17, 1999

[54] BRAKE CONTROL SYSTEMS

[75] Inventor: Chiharu Nakazawa, Kawasaki, Japan

[73] Assignee: Unisia Jecs Corporation, Atsugi, Japan

[21] Appl. No.: 08/996,992

[22] Filed: Dec. 23, 1997

[30] Foreign Application Priority Data

Dec. 26, 1996 [JP] Japan ................................ 8-346928

[51] Int. Cl.⁶ .................................................. B60T 8/32
[52] U.S. Cl. .................................... 303/113.2; 303/116.1; 303/119.1; 180/197
[58] Field of Search ............................. 303/113.2, 113.1, 303/116.1, 119.1, 116.2, 116.3, 116.4, 10–12, 156, 139, 144; 180/197; 188/181 A, 181 R

[56] References Cited

U.S. PATENT DOCUMENTS 5,015,043   5/1991   Resch ...................................... 303/100
5,407,257   4/1995   Iwata ...................................... 303/113.2

Primary Examiner—Douglas C. Butler
Attorney, Agent, or Firm—Foley & Lardner

[57] ABSTRACT

A brake control system includes in a main circuit connecting a master cylinder and a wheel cylinder a normally-open OUT-side gate valve and a fluid-pressure control valve comprising inlet and outlet valves. The system also includes a main pump for discharging brake fluid within a reservoir to the fluid-pressure control valve, and an auxiliary pump for discharging brake fluid to the suction side of the main pump. A normally-closed IN-side gate valve is arranged in an auxiliary suction circuit. A bypass circuit is arranged in parallel with the auxiliary pump, and a circulation solenoid valve is arranged therein. After finishing stabilizing control, a control unit opens the OUT-side gate valve and closes the IN-side gate valve, and opens the circulation solenoid valve during a predetermined period of time.

5 Claims, 4 Drawing Sheets

BRAKE CONTROL SYSTEMS

BACKGROUND OF THE INVENTION

The present invention relates to brake control systems for motor vehicles, which allow wheel anti-lock brake control and stabilizing control such as wheel traction control or vehicle motion control.

One of the conventionally proposed brake control systems which allow stabilizing control is known in U.S. Pat. No. 5,015,043 issued to Resch. This brake control system includes two hydraulic control circuits between a master cylinder as a fluid-pressure source and wheel cylinders of driving and driven wheels. The hydraulic control circuit inputs a fluid pressure produced in the master cylinder and a discharge pressure of a main pump and outputs them to the wheel cylinders. The circuit includes pressure increasing and decreasing valves to control its output pressure with respect to a wheel-cylinder pressure, and an auxiliary pump in series with the main pump to suck brake fluid on the master-cylinder side and discharging it to the suction side of the main pump. Moreover, the circuit includes a normally-open OUT-side gate valve between the master cylinder and the circuit, and a normally-closed IN-side gate valve on the suction side of the auxiliary pump.

During anti-lock brake control, the brake control system keeps the OUT-side gate valve open and the IN-side gate valve closed, and drives a motor to supply the discharge pressure of the main pump to the hydraulic control circuits. And the system actuates the inlet and outlet valves to control the wheel-cylinder pressure. Thus, the wheel skid rate is maintained within a predetermined range, preventing wheel lock or skid. At that time, the auxiliary pump, though driven by the motor, cannot suck and discharge brake fluid due to the IN-side gate valve being closed, failing to fulfill a function of supplying brake fluid.

During stabilizing control, the brace control system closes the OUT-side gate valve and opens the IN-side gate valve, and drive the motor of the auxiliary pump to supply the fluid pressure of the master cylinder to the main pump which supplies to the hydraulic control circuit the fluid pressure derived from the auxiliary pump upon start-up, then its discharge pressure obtained by sucking brake fluid within a reservoir. And the system actuates the inlet and outlet valves to supply a brake-fluid pressure to the wheel cylinders, producing a braking force to control wheel torque or stabilize a vehicle posture by producing a yaw moment in a vehicle.

However, the known brake control system produces the following problem. During stabilizing control, the system opens the normally-closed IN-side gate valve and closes the normally-open OUT-side gate valve, and drives the main and auxiliary pumps to control the wheel-cylinder pressure. When finishing stabilizing control, stopping of the motors and switching of the gate valves to the normal state are carried out simultaneously.

In that case, after receiving stop signals, the motors continue to rotate for a period of time by inertia, so that the main and auxiliary pumps also continue to operate for a period of time. Therefore, brake fluid within a section downstream of the IN-side gate valve as closed continue to be sucked, producing a negative pressure between the IN-side gate valve and a suction valve of the auxiliary pump. Upon subsequent stabilizing control, due to this negative pressure, the auxiliary pump cannot suck brake fluid immediately after its starting, failing to fulfil a function of supplying brake fluid. Thus, satisfactory pressure rise performance cannot be obtained upon starting of the main pump, resulting in insufficient control responsivity. Achievement of sufficient control responsivity needs determination of motor and pump capacities in consideration of the negative pressure, causing an inevitable increase in the motor and pump capacities, resulting in an increase in system size and manufacturing cost.

It is, therefore, an object of the present invention to provide brake control systems for motor vehicles, which allow wheel anti-lock brake control and stabilizing control, with sufficient control responsivity and reduced system size and manufacturing cost.

SUMMARY OF THE INVENTION

One aspect of the present invention lies in providing a system for controlling a brake device for a vehicle with a wheel cylinder for producing braking force, comprising:

a fluid-pressure source, said fluid-pressure source producing a fluid pressure in accordance with driver's brake operation;

a main circuit arranged between the wheel cylinder and said fluid-pressure source;

a control valve arranged in said main circuit, said control valve controlling a fluid pressure within the wheel cylinder;

a drain circuit connected to said control valve;

a reservoir arranged in said drain circuit;

a first pump provided with a first suction circuit with a suction valve and a first discharge circuit with a discharge valve, said first suction circuit being connected to said reservoir, said first discharge valve being connected to said control valve;

a second pump provided with a second suction circuit with a suction valve and a second discharge circuit with a discharge valve, said second suction circuit being connected to said fluid-pressure source, said second discharge circuit being connected to said first suction circuit;

a bypass circuit arranged in parallel with said second pump, said bypass circuit connecting said second discharge circuit and said second suction circuit;

a solenoid valve arranged in said bypass circuit;

a motor connected to said first and second pumps, said motor driving said first and second pumps;

a first gate valve arranged between said fluid-pressure source and said suction valve of said second suction circuit, said first gate valve being normally closed;

a second gate valve arranged between said fluid-pressure source and said control valve, said second gate valve being normally open; and a control unit connected to said control valve, said motor and said first and second gate valves, said control unit carrying out an anti-lock brake control during operation of said fluid-pressure source and a vehicle stabilizing control during non-operation of said fluid-pressure source, said control unit actuating said first and second pumps through said motor and opening said first gate valve and closing said second gate valve during said vehicle stabilizing control, said control unit carrying out a finishing control to open a solenoid valve as normally closed during a predetermined period of time after completion of said vehicle stabilizing control.

Another aspect of the present invention lies in providing a vehicle, comprising:

a wheel cylinder, said wheel cylinder producing braking force;

a fluid-pressure source, said fluid-pressure source producing a fluid pressure in accordance with driver's brake operation;

a main circuit arranged between said wheel cylinder and said fluid-pressure source;

a control valve arranged in said main circuit, said control valve controlling a fluid pressure within said wheel cylinder;

a drain circuit connected to said control valve;

a reservoir arranged in said drain circuit;

a first pump provided with a first suction circuit with a suction valve and a first discharge circuit with a discharge valve, said first suction circuit being connected to said reservoir, said first discharge valve being connected to said control valve;

a second pump provided with a second suction circuit with a suction valve and a second discharge circuit with a discharge valve, said second suction circuit being connected to sail fluid-pressure source, said second discharge circuit being connected to said first suction circuit;

a bypass circuit arranged in parallel with said second pump, said bypass circuit connecting said second discharge circuit and said second suction circuit;

a solenoid valve arranged in said bypass circuit;

a motor connected to said first and second pumps, said motor driving said first and second pumps;

a first gate valve arranged between said fluid-pressure source and said suction valve of said second suction circuit, said first gate valve being normally closed;

a second gate valve arranged between said fluid-pressure source and said control valve, said second gate valve being normally open; and a control unit connected to said control valve, said motor and said first and second gate valves, said control unit carrying out an anti-lock brake control during operation of said fluid-pressure source and a vehicle stabilizing control during non-operation of said fluid-pressure source, said control unit actuating said first and second pumps through said motor and opening said first gate valve and closing said second gate valve during said vehicle stabilizing control, said control unit carrying out a finishing control to open a solenoid valve as normally closed during a predetermined period of time after completion of said vehicle stabilizing control.

DETAILED DESCRIPTION OF THE INVENTION

Figure 1:
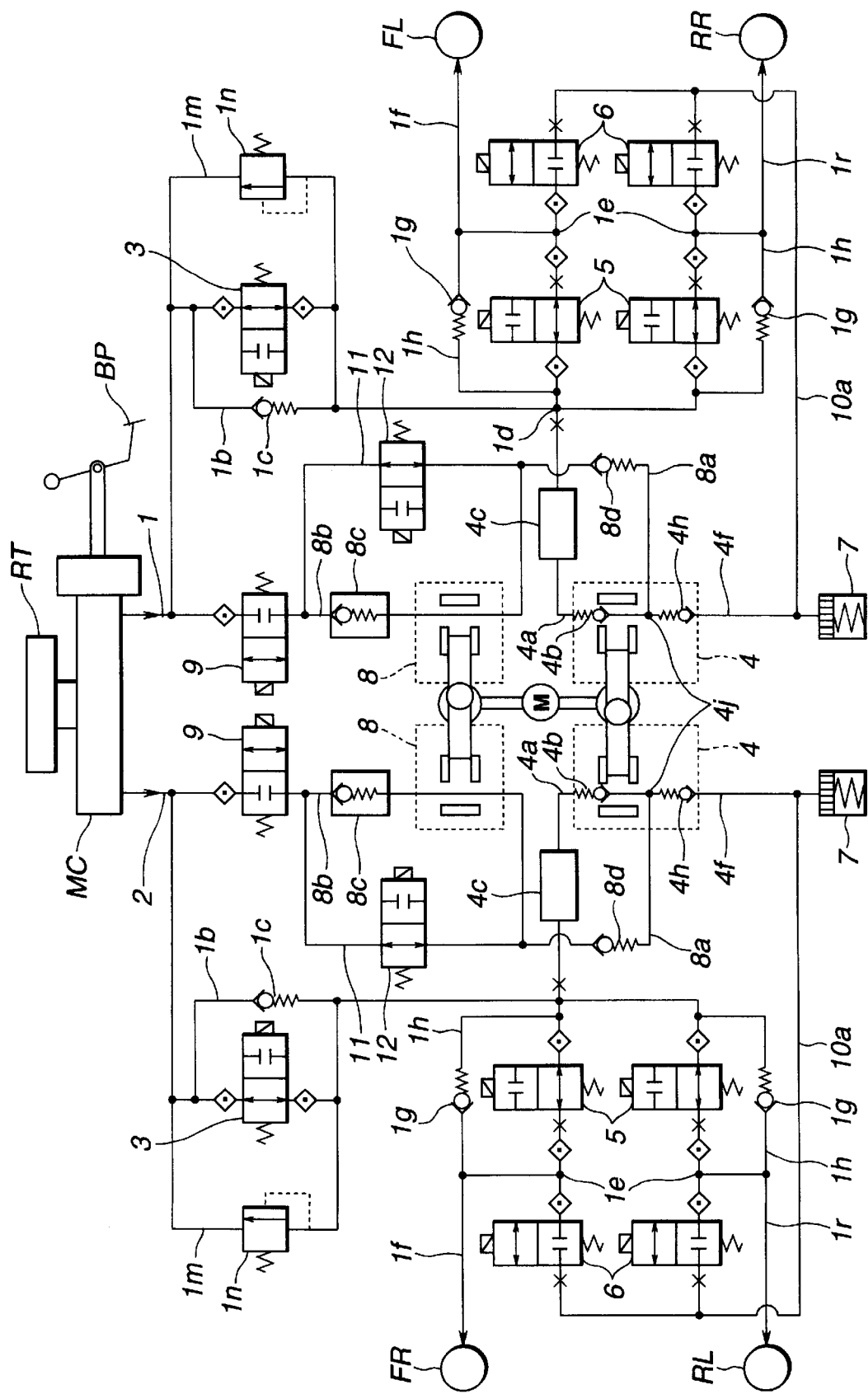
FIG. 1 is a block diagram showing a first embodiment of a brake control system for motor vehicles according to the present invention.

Referring to the drawings wherein like reference numerals designate like parts throughout the views, a brake control system for motor vehicles embodying the present invention will be described.

Figure 2:
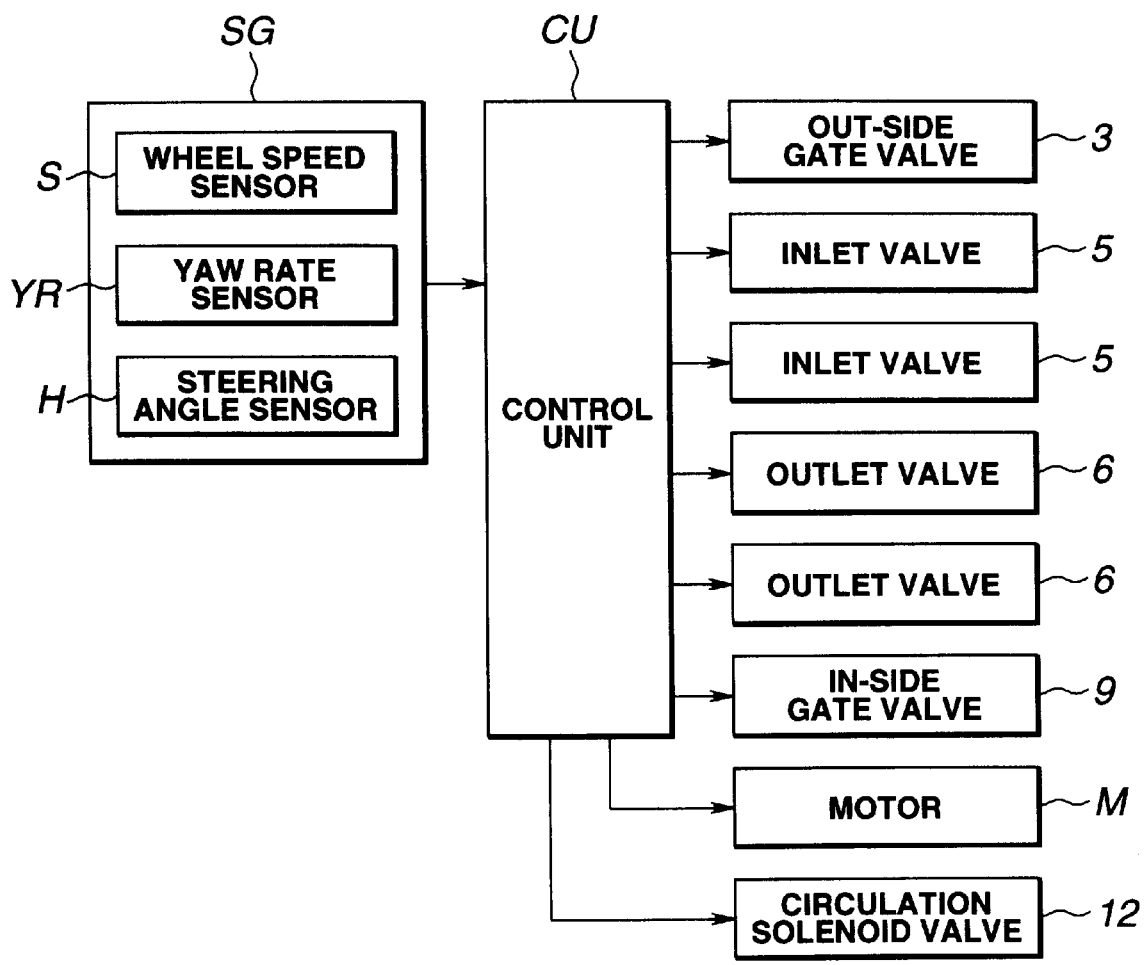
FIG. 2 is a block schematic diagram showing control carried out by a control unit.
Figure 3:
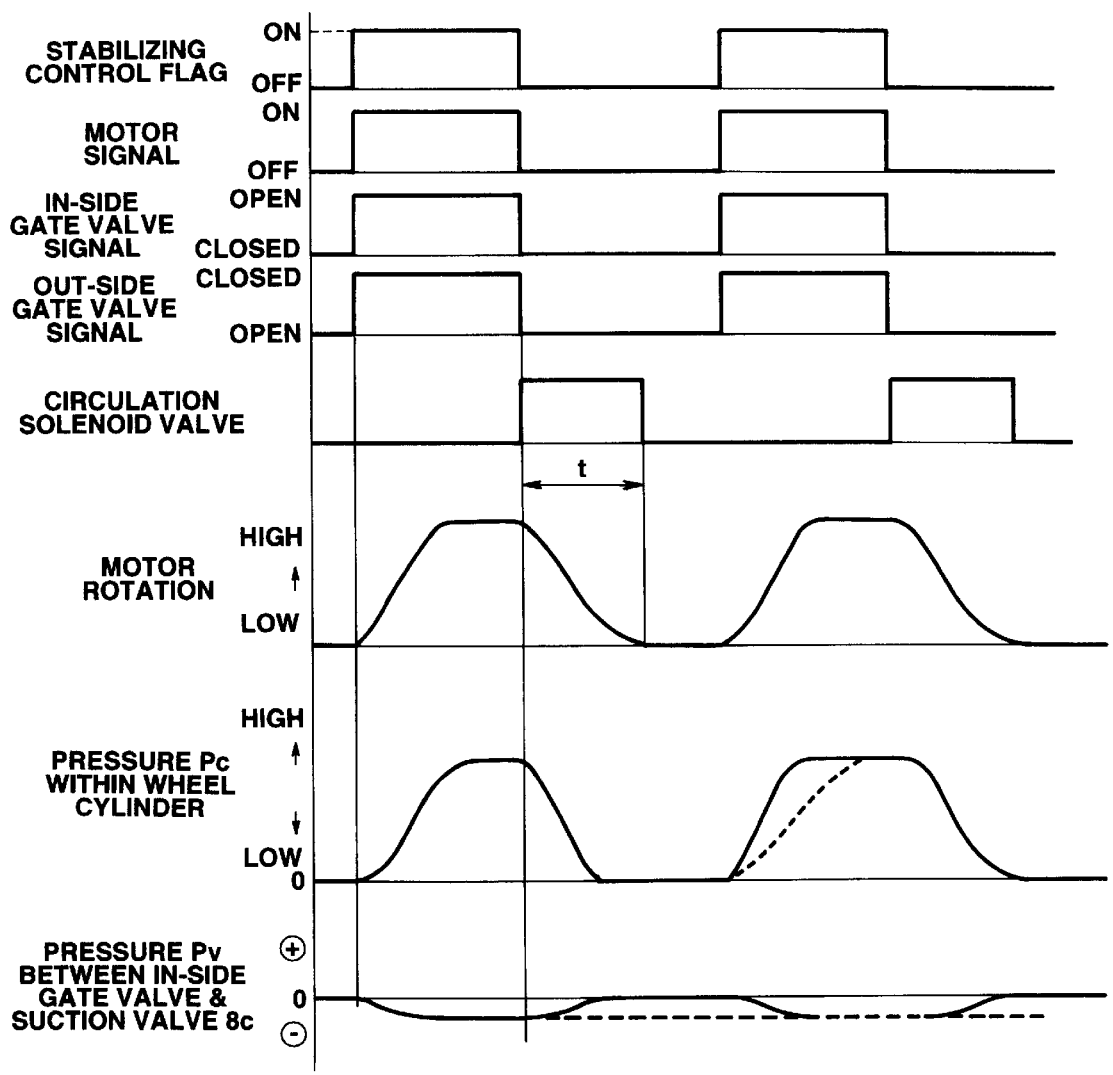
FIG. 3 is a time chart showing operation of the first embodiment.

FIGS. 1–3 show a first embodiment of the present invention. Referring to FIG. 1, the brake control system includes a wheel cylinder FL of a front-left wheel, a wheel cylinder RR of a rear-right wheel, a wheel cylinder FR of a front-right wheel, a wheel cylinder RL of a rear-left wheel, and a master cylinder MC as a fluid-pressure source for supplying a fluid pressure to the wheel cylinders FL, RR, FR, RL. The master cylinder MC produces, in accordance with depression of a brake pedal BP, two brake-fluid pressures by a first channel circuit 1 which constitutes a main circuit connected to the wheel cylinders FL, RR and a second channel circuit 2 which constitutes a main circuit connected to the wheel cylinders FR, RL connected in the X-shaped way. The master cylinder MC includes a reservoir tank RT for holding working fluid.

In view of the first and second channel circuits 1, 2 having the same structure, a description will be made with regard to the first channel circuit 1 only.

The first channel circuit 1 includes a rear-wheel branch circuit 1r directed to the wheel cylinder RR and a front-wheel branch circuit 1f directed to the wheel cylinder FL.

Arranged in the first channel circuit 1 and upstream thereof are an OUT-side gate valve 3, a gate-valve bypass circuit 1b for detouring the OUT-side gate valve 3, and a relief circuit 1m. The OUT-side gate valve 3 includes a normally-closed two-port two-position solenoid valve which puts the first channel circuit 1 in communication by a spring force when not actuated, and shuts it off when actuated. The gate-valve bypass circuit 1b allows flow from the master cylinder MC to the wheel cylinders FL, RR by means of a one-way valve 1c arranged therein. Hereafter refer the side relatively near the master cylinder MC to as "upstream", and the side relatively near the wheel cylinders FL, RR to as "downstream". A relief valve 1n is arranged in the relief circuit 1m to relieve a fluid pressure when exceeding a predetermined value.

A main discharge circuit 4a is connected to a connection 1d located between the OUT-side gate valve 3 and the branch circuits 1f, 1r. Arranged in the main discharge circuit 4a are a discharge valve 4b in the form of a one-way valve for absorbing a discharge ripple for preventing counterflow and a damper 4c.

An inlet valve 5 and an outlet valve 6 are arranged in each branch circuit 1r, 1f to decrease, maintain, or decrease a brake-fluid pressure of each wheel cylinder FL, RR. Specifically, the inlet valve 5 is arranged in the branch circuit 1r, 1f, and includes a normally-open two-port two-position solenoid valve which puts the branch circuit 1r, 1f in communication by a spring force when not actuated, and shuts it off when actuated. The outlet valve 6 is arranged in a drain circuit 10a connecting branch points 1e located downstream of the inlet valves 5 of the branch circuits 1r, 1f or on the side of the wheel cylinders FL, RR and a reservoir 7, and includes a normally-closed two-port two-position solenoid valve which shuts the drain circuit 10a off when not actuated, and puts it in communication when actuated. Arranged in each branch circuit 1r, 1f is an inlet-valve bypass circuit 1h for detouring the inlet valve 5 and including a one-way valve 1g which allows flow from downstream to upstream only. A main suction circuit 4f is connected to the drain circuit 10a to communicate with the suction side of the main pump 4, and includes a suction valve 4h in the form of a one-way valve for allowing the main pump 4 to suck brake fluid from the reservoir 7.

An auxiliary discharge circuit 8a is connected to a branch point 4j located in the main suction circuit 4f and between the suction valve 4h and the main pump 4, and includes a discharge valve 8d. The auxiliary discharge circuit 8a is also connected to the discharge side of an auxiliary pump 8. Specifically, during stabilizing control, the auxiliary pump 8 is driver in series with the main pump 4 to supply brake fluid from the master cylinder MC to the suction side of the main pump 4, improving a rise of a discharge pressure of the main pump 4. The auxiliary suction circuit 8b is connected to the master cylinder MC or a reservoir tank RT, and also to the suction side of the auxiliary pump 8. The main and auxiliary pumps 4, 8 are driven by motors M, respectively.

An IN-side gate valve 9 and a suction valve 8c for preventing counterflow are arranged in the auxiliary suction circuit 8b. The IN-side gate valve 9 includes a normally-closed two-port two-position solenoid valve which shuts the auxiliary suction circuit 8b by a spring force when not actuated, and puts it in communication when actuated.

A bypass circuit 11 is arranged in parallel with the auxiliary pump 8. Specifically, the bypass circuit 11 has one end connected to the auxiliary suction circuit 8b and between the IN-side gate valve 9 and the suction valve 8c, and another end connected to the auxiliary discharge circuit 8a and upstream of the discharge valve 8d. A circulation solenoid valve 12 is arranged in the bypass circuit 11, and includes a normally-closed two-port two-position solenoid valve which shuts the bypass circuit 11 off by a spring force when not actuated, and puts it in communicate on when actuated.

Referring to FIG. 2, the valves 3, 5, 6, 9, 12 are controlled by a control unit CU. Specifically, connected to the control unit CU is a sensor group SG including a wheel speed sensor S for sensing a rotating speed of each wheel, a yaw rate sensor YR for sensing a yaw rate of a vehicle body, and a steering angle sensor H for sensing a steering angle of a vehicle. The control unlit CU receives signals derived from the sensor group SG to determine a skid rate of each wheel. The control unit CU carries out anti-lock brake control for reducing the skid rate when exceeding a predetermined value upon braking, or stabilizing control such as traction control for restraining skid of a driving wheel upon non-braking and motion control for stabilizing a vehicle posture by producing a yaw moment in the vehicle. A detailed description will not be made with regard to those controls which are not relevant to the present invention. It is necessary to operate the main pump 4 during anti-lock brake control, and the main and auxiliary pumps 4, 8 during stabilizing control. Since the pumps 4, 8 are driven by a common motor M, the control unit CU drives the motor M when operating either pump 4, 8.

Next, the operation of the first embodiment will be described. In view of the first and second channel circuits 1, 2 having the same operation, a description will be made with regard to the first channel circuit 1 only.

a) Upon Ordinary Brake Operation

Ordinarily, the valves 3, 5, 6, 9, 12 are in non-operation as shown in FIG. 1. In this state, when depressing the brake pedal BP, the brake-fluid pressure produced in the master cylinder MC is transmitted to the wheel cylinders FL, RR through the first channel circuit 1 via the OUT-side gate valve 3, the inlet valve 5, and the branch circuits 1f, 1r, carrying out braking of the wheels in accordance with depression of the brake pedal BP.

b) Upon Anti-lock Brake Control

When the wheels are locked or comes near to be locked during brake operation, the control unit CU detects it in accordance with the skid rate to carry out anti-lock brake control for preventing locking of the wheel by maintaining the skid rate within a predetermined range.

Anti-lock brake control is a control which ensures decreasing, maintaining, or increasing of the brake-fluid pressure to prevent locking of the wheel during brake operation. When the skid rate of one of the front-left and rear-right wheels or the skid rates of the two are greater than a first predetermined value, the control unit CU starts driving of the motor M, and supplies power to the inlet and outlet valves 5, 6 of the branch circuits 1r, 1f connected to the wheel cylinders FL, RR for braking the wheels which come near to be locked so as to close the inlet valve 5 and open the outlet valve 6.

Closing of the inlet valve 5 stops an increase in brake-fluid pressures within the wheel cylinders FL, RR from the master cylinder MC. On the other hand, opening of the outlet valve 6 allows a decrease in brake-fluid pressures within the wheel cylinders FL, RR by discharge of brake fluid therefrom to the reservoir 7 through a discharge circuit 10a, relieving a braking force. Brake fluid accumulated in the reservoir 7 is sucked in a main suction circuit 4f by driving of the main pump 4, which is then recirculated to the first channel circuit 1 through a main discharge circuit 4a.

When this reduction in braking force makes the skid rate smaller than the first predetermined value, the control unit CU cuts off power supply to the outlet valve 6 to close it, maintaining the brake-fluid pressures within the wheel cylinders FL, RR.

When this maintaining of the brake-fluid pressures makes the skid rate smaller than a second predetermined value, the control unit CU cuts off power supply to the inlet valve 5 to open it. As a consequence, high-pressure brake fluid within the first channel circuit 1 is supplied to wheel cylinders FL, RR through the inlet valve 5, increasing the braking force again.

Repetition of the above operation allows maintaining of the skid rate of each wheel within the predetermined range during depression of the brake pedal BP, achieving anti-lock brake control wherein a maximum braking force is obtained with locking or the wheel prevented.

Upon anti-lock brake control, the IN-side gate valve 9 is supplied with no power and is kept closed, so that the auxiliary pump 8, though driven by the motor M, cannot suck brake fluid, failing to fulfill a function of supplying brake fluid. If the control unit CU is constructed to carry out control for opening the circulation solenoid valve 12 during anti-lock brake control, brake fluid between the IN-side gate valve 9 and the suction valve 8c is circulated through the bypass circuit 11 during futile operation of the auxiliary pump 8, producing no negative pressure between the two valves 9, 8c.

c) Upon Stabilizing Control

When carrying out stabilizing control such as maintaining of increased skid rate of the driving wheels due to quick start and acceleration of the vehicle within a predetermined range, or stabilizing of a vehicle posture by the braking force, the control unit CU turns a stabilizing control flag on to as shown in FIG. 3 drive the motor M and supply power to the gate valves 3, 9. By this, the OUT-side gate valve 3 is closed to shut off the first channel circuit 1 at that position, and the IN-side gate valve 9 is opened to put the auxiliary suction circuit 8b in communication.

Thus, the auxiliary pump 8 sucks brake fluid within the master cylinder MC or the reservoir tank RT to discharge it to the auxiliary discharge circuit 8a, whereas the main pump 4 sucks brake fluid from the auxiliary discharge circuit 8a to discharge it to the main discharge circuit 4a, obtaining increased brake-fluid pressures within the wheel cylinders FL, RR. At that time, referring to FIG. 3, the rotating speed of the motor M is increased with an inclination, in accordance with which a wheel-cylinder pressure Pc is also increased with an inclination.

The operation of the inlet valve 5 and the outlet valve 6 increases, maintains, or decreases the brake-fluid pressure within the wheel cylinder FL or RR to produce a desired braking force, obtaining reduced skid rate or stabilized vehicle posture through a yaw moment produced in the vehicle body. One of the examples of this posture stabilizing control is such that upon oversteer a braking force is provided to a rear wheel as a turning outer wheel to produce a yaw moment in the understeer direction, and upon understeer it is provided to a front wheel as a turning outer wheel to produce a yaw moment in the oversteer direction.

When it is determined that execution of stabilizing control is not needed since the skid rate of the wheel is maintained within the predetermined range or a vehicle posture is stabilized, the stabilizing control flag is turned off as shown in FIG. 3 to cut off power supply to the motor M and the gate valves 3, 9. The circulation solenoid valve 12 is supplied with power during a predetermined period of time "t" from cutoff of power supply to put the bypass circuit 11 in communication. The predetermined period of time "t" is equal to, e.g. approximately 300 mm/sec, and slightly longer than a time necessary to stop inertia rotation of the motor M after cutoff of power supply thereto.

While the pumps 4, 8 is driven by inertia rotation of the motor M after cutoff of power supply thereto, the auxiliary pump 8 sucks brake fluid from the auxiliary suction circuit 8$b$ to discharge it to the auxiliary discharge circuit 8$a$. At that time, due to the circulation solenoid valve 12 being open, the auxiliary suction and discharge circuits 8$b$, 8$a$ communicate with each other through the bypass circuit 11. Therefore, the auxiliary suction and discharge circuits 8$b$, 8$a$ are of the same pressure through the auxiliary pump 8, having no negative pressure between the IN-side gate valve 9 and the suction valve 8$c$ of the auxiliary pump 8.

That is, with the known structure having no bypass circuit 11, nor circulation solenoid valve 12, after the IN-side gate valve is closed simultaneously with stopping of the motor M, the auxiliary pump 8 sucks brake fluid from the auxiliary suction circuit 8$b$ during inertia rotation of the motor M. As a consequence, referring to FIG. 3, a pressure Pv between the IN-side gate valve 9 and the suction valve 8$c$ is a negative value, which is maintained as indicated by broken line. This delays, upon subsequent stabilizing control, a rise of the discharge pressure of the auxiliary pump 8, so that the main pump 4 cannot suck brake fluid immediately from the auxiliary discharge circuit 8$a$, resulting in slow rise of the wheel-cylinder pressure Pc as indicated by broken line.

On the other hand, with the first embodiment, referring to FIG. 3, the pressure Pv between the IN-side gate valve 9 and the suction valve 8$c$ is not a negative value as indicated by fully-drawn line, obtaining quick rise of the wheel-cylinder pressure Pc upon subsequent stabilizing control as indicated by fully-drawn line, resulting in excellent control responsivity.

As described above, the first embodiment is constructed to include the bypass circuit 11 arranged in parallel with the auxiliary pump 8, and the circulation solenoid valve 12 arranged in the bypass circuit 11, which is opened during the predetermined period of time "t" after finishing stabilizing control. This prevents the pressure Pv between the IN-side gate valve 9 and the suction valve 8$c$ of the auxiliary pump 8 from being maintained at a negative value, obtaining quick rise of the fluid pressure upon subsequent stabilizing control, producing an effect of excellent control responsivity. This effect allows a reduction in capacity of the pumps 4, 8, resulting in an effect of a reduction in system size and manufacturing cost.

The system may be constructed such that the outlet valve 6 is opened simultaneously with opening of the circulation solenoid valve 12 after stopping of the motor M. In that case, the main pump 4 sucks brake fluid from the first channel circuit 1 through the discharge circuit 10$d$, and less brake fluid from the side of the auxiliary pump 8, resulting in further reduced possibility of producing a negative pressure within a section downstream of the IN-side gate valve 9.

Moreover, the system may be constructed such that while one channel circuit, e.g. the first channel circuit 1, carries out the above finishing control, the other channel circuit, e.g. the second channel circuit 2, opens the IN-side gate valve 9. In that case, while the first channel circuit 1 carries out stabilizing control, the second channel circuit 2 also has the pumps 4, 8 in operation since the two have take motor M as a common drive source. At that time, the second channel circuit 2 has no pressure increase of the wheel cylinders FR, RL due to the IN-side gate valve 9 being closed, but produces a negative pressure between the IN-side gate valve 9 and the suction valve 8$c$. This negative pressure is removed by brake fluid supplied from the master cylinder MC by opening of the IN-side gate valve 9 of the second channel circuit 2 along with execution of finishing control in the first channel circuit 1.

Figure 4:
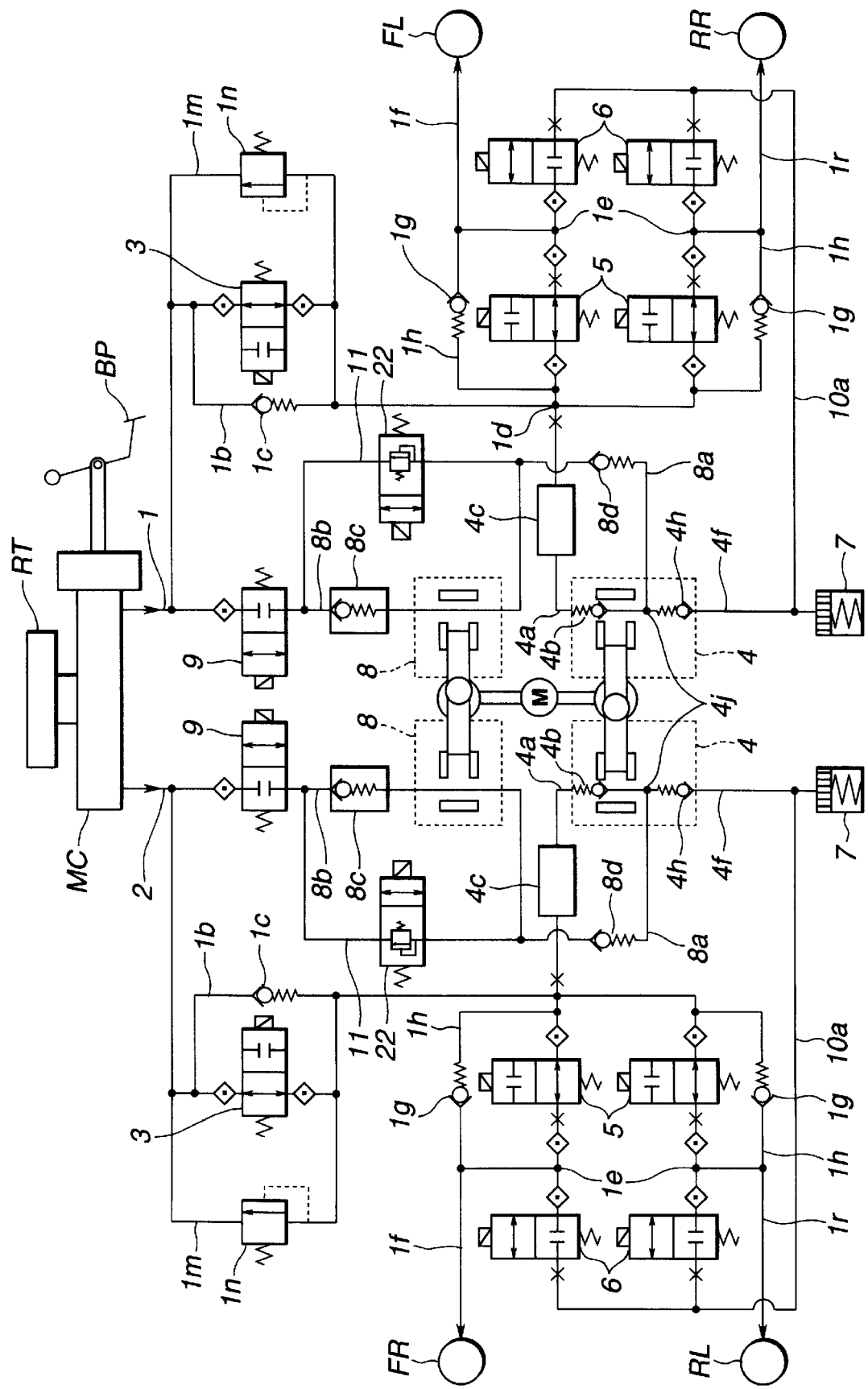
FIG. 4 is a view similar to FIG. 1, showing a second embodiment of the present invention.

FIG. 4 shows a second embodiment of the present invention which is substantially the same as the first embodiment except that a circulation solenoid valve 22 has therein a relief valve arranged in parallel. Specifically, in the normal state that the bypass circuit 11 is closed, when a fluid pressure within the auxiliary discharge circuit 8$a$ is greater than a predetermined value by operation of the auxiliary pump 8, the circulation solenoid valve 22 relieves it to the auxiliary suction circuit 8$b$. Thus, the use of the above structure for increasing the control responsivity allows an effective improvement in fail-safe performance.

Having described the present invention with regard to the preferred embodiments, it is noted that the present invention is not limited thereto, and various changes and modifications can be made without departing from the scope of the present invention. By way of example, in the embodiments, the predetermined period of time "t" for opening of the circulation solenoid valve 12 upon finishing control is equal to approximately 300 mm/sec, alternatively, it may be determined in accordance with a characteristic of a motor as applied to be equal to a time necessary to stop inertia rotation of the motor after cutoff of power supply thereto.

Further, in the embodiments, the auxiliary discharge circuit 8$a$ of the auxiliary pump 8 is connected downstream of the suction valve 4$h$ of the main pump 4, alternatively, it may be connected upstream thereof as in the known system.

Furthermore, in the embodiments, the single motor M serves to operate the two main pumps 4 and the two auxiliary pumps 8, alternatively, motors may serve to operate the main and auxiliary pumps 4, 8, or the first and second channel circuits 1, 2.

Finally, in the embodiments, the fluid-pressure source is in the form of the master cylinder MC, alternatively, it may be a unit which produces, in accordance with a driver's brake operation amount or speed as detected, a fluid pressure through a fluid-pressure control valve operated by a controller.

What is claimed is:

1. A system for controlling a brake device for a vehicle with a wheel cylinder for producing braking force, comprising:

a fluid-pressure source, said fluid-pressure source producing a fluid pressure in accordance with driver's brake operation;

a main circuit arranged between the wheel cylinder and said fluid-pressure source;

a control valve arranged in said main circuit, said control valve controlling a fluid pressure within the wheel cylinder;

a drain circuit connected to said control valve;

a reservoir arranged in said drain circuit;

a first pump provided with a first suction circuit with a suction valve and a first discharge circuit with a discharge valve, said first suction circuit being connected to said reservoir, said first discharge valve being connected to said control valve;

a second pump provided with a second suction circuit with a suction valve and a second discharge circuit with a discharge valve, said second suction circuit being connected to said fluid-pressure source, said second discharge circuit being connected to said first suction circuit;

a bypass circuit arranged in parallel with said second pump, said bypass circuit connecting said second discharge circuit and said second suction circuit;

a solenoid valve arranged in said bypass circuit;

a motor connected to said first and second pumps, said motor driving said first and second pumps;

a first gate valve arranged between said fluid-pressure source and said suction valve of said second suction circuit, said first gate valve being normally closed;

a second gate valve arranged between said fluid-pressure source and said control valve, said second gate valve being normally open; and a control unit connected to said control valve, said motor and said first and second gate valves, said control unit carrying out an anti-lock brake control during operation of said fluid-pressure source and a vehicle stabilizing control during non-operation of said fluid-pressure source, said control unit actuating said first and second pumps through said motor and opening said first gate valve and closing said second gate valve during said vehicle stabilizing control, said control unit carrying out a finishing control to open a solenoid valve as normally closed during a predetermined period of time after completion of said vehicle stabilizing control.

2. A system as claimed in claim 1, wherein said solenoid valve is provided with a relief valve for relieving brake fluid to said second suction circuit when with said bypass circuit being closed, a fluid pressure within said second discharge circuit is greater than a predetermined value.

3. A system as claimed in claim 1, wherein said main circuit comprises first and second channel circuits having the same structure, said control unit controlling said first and second channel circuits such that while said first channel circuit carries out said finishing control, said second channel circuit opens a corresponding first gate valve.

4. A system as claimed in claim 1, wherein said control valve comprises a normally-open inlet valve arranged in said main circuit and a normally-closed outlet valve arranged in said drain circuit, said control unit opening said outlet valve during said finishing control.

5. A vehicle, comprising:

a wheel cylinder, said wheel cylinder producing braking force;

a fluid-pressure source, said fluid-pressure source producing a fluid pressure in accordance with driver's brake operation;

a main circuit arranged between said wheel cylinder and said fluid-pressure source;

a control valve arranged in said main circuit, said control valve controlling a fluid pressure within said wheel cylinder;

a drain circuit connected to said control valve;

a reservoir arranged in said drain circuit;

a first pump provided with a first suction circuit with a suction valve and a first discharge circuit with a discharge valve, said first suction circuit being connected to said reservoir, said first discharge valve being connected to said control valve;

a second pump provided with a second suction circuit with a suction valve and a second discharge circuit with a discharge valve, said second suction circuit being connected to said fluid-pressure source, said second discharge circuit being connected to said first suction circuit;

a bypass circuit arranged in parallel with said second pump, said bypass circuit connecting said second discharge circuit and said second suction circuit;

a solenoid valve arranged in said bypass circuit;

a motor connected to said first and second pumps, said motor driving said first and second pumps;

a first gate valve arranged between said fluid-pressure source and said suction valve of said second suction circuit, said first gate valve being normally closed;

a second gate valve arranged between said fluid-pressure source and said control valve, said second gate valve being normally open; and a control unit connected to said control valve, said motor and said first and second gate valves, said control unit carrying out an anti-lock brake control during operation of said fluid-pressure source and a vehicle stabilizing control during non-operation of said fluid-pressure source, said control unit actuating said first and second pumps through said motor and opening said first gate valve and closing said second gate valve during said vehicle stabilizing control, said control unit carrying out a finishing control to close said solenoid valve normally and open it during a predetermined period of time after completion of said vehicle stabilizing control.

* * * * *